US007246028B2

(12) United States Patent
Otterbach et al.

(10) Patent No.: US 7,246,028 B2
(45) Date of Patent: Jul. 17, 2007

(54) METHOD FOR TRANSMITTING DATA FROM SENSOR TO A CONTROL UNIT, AND A CORRESPONDING SENSOR AND CONTROL UNIT

(75) Inventors: Jens Otterbach, Wenden (DE); Christian Ohl, Pfullingen (DE); Pascal Kocher, Ottrott (FR); Gerald Nitsche, Gammertingen (DE); Jochen Schomacker, Reutlingen (DE); Michael Ulmer, Moessingen (DE); Rolf Aidam, Endingen (DE); Boris Adam, Gaeufelden (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/477,314

(22) PCT Filed: Sep. 24, 2002

(86) PCT No.: PCT/DE02/03603

§ 371 (c)(1),
(2), (4) Date: May 26, 2004

(87) PCT Pub. No.: WO03/077220

PCT Pub. Date: Sep. 18, 2003

(65) Prior Publication Data

US 2004/0204890 A1 Oct. 14, 2004

(30) Foreign Application Priority Data

Mar. 8, 2002 (DE) ............................... 102 10 131

(51) Int. Cl.
*G06F 15/00* (2006.01)

(52) U.S. Cl. ....................... 702/138; 340/532; 700/301

(58) Field of Classification Search ................. 702/33, 702/116, 138–140, 188; 340/532–534, 2.1–2.2, 340/870.05; 700/9–10, 301
See application file for complete search history.

(56) References Cited

U.S. PATENT DOCUMENTS

| | | | | |
|---|---|---|---|---|
| 4,058,975 | A | 11/1977 | Gilbert et al. | 60/39.281 |
| 5,301,122 | A * | 4/1994 | Halpern | 702/62 |
| 5,528,499 | A * | 6/1996 | Hagenbuch | 701/50 |
| 5,691,714 | A | 11/1997 | Mehnert et al. | 340/870.05 |
| 5,710,723 | A * | 1/1998 | Hoth et al. | 702/181 |
| 5,870,695 | A | 2/1999 | Broden et al. | 702/138 |
| 5,899,962 | A * | 5/1999 | Louwagie et al. | 702/138 |
| 5,999,528 | A * | 12/1999 | Chow et al. | 370/365 |
| 6,577,986 | B1 * | 6/2003 | Casey-Cholakis | 702/179 |
| 6,892,129 | B2 * | 5/2005 | Miyano | 701/107 |
| 2002/0019673 | A1 * | 2/2002 | Mirelli et al. | 700/19 |
| 2002/0072809 | A1 * | 6/2002 | Zuraw | 700/9 |
| 2004/0068354 | A1 * | 4/2004 | Tabe | 701/45 |
| 2004/0124697 | A1 * | 7/2004 | MacGregor et al. | 303/89 |

FOREIGN PATENT DOCUMENTS

| | | |
|---|---|---|
| DE | 101 14 504 | 10/2002 |
| DE | 101 49 332 | 4/2003 |

* cited by examiner

*Primary Examiner*—Marc S. Hoff
*Assistant Examiner*—Mary Catherine Baran
(74) *Attorney, Agent, or Firm*—Kenyon & Kenyon LLP

(57) ABSTRACT

A method of data transmission from a sensor to a control unit and a sensor and control unit are described, the sensor transmitting both differential values and absolute values. The differential values are analyzed in the control unit to perform the function provided, and the absolute values are analyzed for the plausibility check of the function.

9 Claims, 4 Drawing Sheets

METHOD FOR TRANSMITTING DATA FROM SENSOR TO A CONTROL UNIT, AND A CORRESPONDING SENSOR AND CONTROL UNIT

FIELD OF THE INVENTION

The present invention relates to a method for data transmission from a sensor to a control unit as well as a corresponding sensor and a corresponding control unit for restraining systems.

BACKGROUND INFORMATION

Methods of transmitting data from at least one sensor to a control unit, in particular in connection with restraining systems, in which the data is transmitted using current modulation via a two-wire line from the sensors to a control unit in accordance with a predetermined format, are known from German Published Patent Application Nos. 101 14 504 and 101 49 332. The format of the data transmission provides a fixed assignment of parts of the value range available for the data transmission to the sensor values, a first part of the value range being used for sensor values, i.e., useful data, a second part for status and error messages, and a third part for sensor identification data. These parts are separated from one another and follow one another during transmission.

Furthermore, in many applications, in particular in connection with restraining systems, the use of pressure sensors, which are distributed in the vehicle and are connected via such an interface or another interface to a central control unit, is known.

SUMMARY OF THE INVENTION

Through the transmission of an absolute pressure value for pressure sensors which transmit a differential pressure as the useful data, performing a function verification of these pressure sensors, and therefore error detection, is advantageously made possible in a system which includes at least two sensors and a central control unit.

It is especially advantageous that fault-free functioning of all pressure sensors located in the system is provided using cost-effective software implementation without additional hardware expense. Introduction of error detection in such a sensor system is thus made possible through a change in the software alone, without a change in the system.

It is especially advantageous to transmit the absolute pressure value instead of the differential measured pressure value in the course of the initialization phase of the system. In this way, checking the pressure sensors before beginning to operate the system is made possible.

In an especially simple way, the known current-based two-wire interface is used for data transmission.

According to a further aspect of the present invention, checking of pressure sensors during running operation in a sensor system having a central control unit is made possible in an especially advantageous way if the transmission of absolute pressure values during running operation of the system is mixed with the transmission of differential pressure values.

It has been shown to be especially advantageous in this case, for an interface whose value range for data transmission is divided into at least two parts, to perform the absolute pressure values in the part of the value range which is not available for the sensor measured values, i.e., the differential pressure values. In this way, mutual influence of the measured value and absolute pressure value is effectively avoided.

It is especially advantageous, for the data format described in the related art initially cited, to code the absolute pressure values in a value range which lies outside the useful signal value range, the absolute pressure values being assigned additional identification codes. Both the identification code and the data word are located outside the value range of the differential measured pressure values, so that advantageously there can be no confusion of the individual pressure values.

The absolute pressure values are advantageously transmitted only as long as there is no significant signal change of the differential pressure. As soon as such a change occurs, the running absolute pressure transmission is stopped and the system switches to differential pressure transmission. In this way, in particular for use in connection with restraining systems, the system operation and its intended result are not impaired.

DETAILED DESCRIPTION

Figure 1:
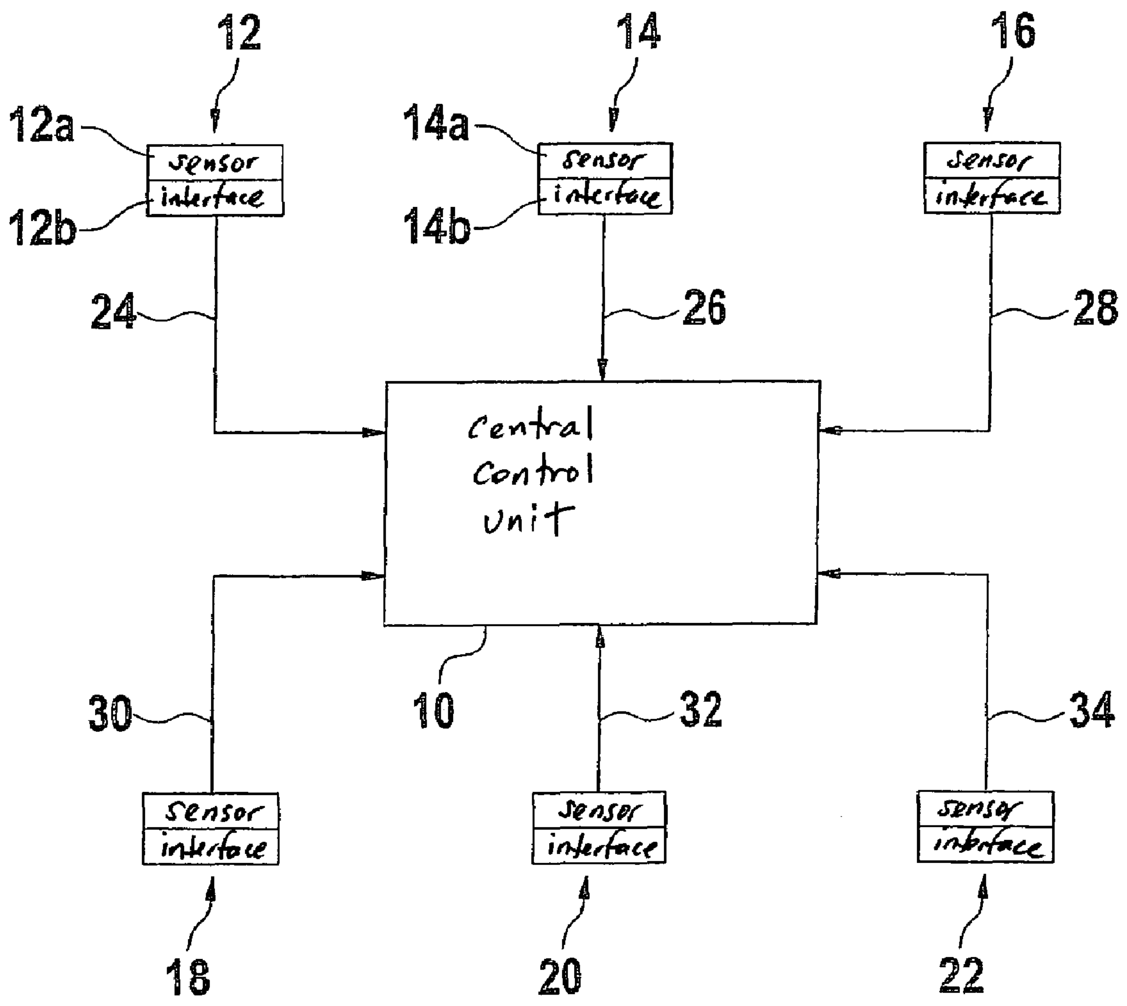
FIG. 1 shows an overview of a sensor system having a central control unit.

FIG. 1 shows a central control unit 10 which is connected to decentralized sensors 12, 14, 16, 18, 20, 22. In this case, the sensors each include a sensor element (cf. 12*a*, etc.) and an interface component (cf. 12*b*, etc.), which is implemented in the preferred exemplary embodiment as an ASIC and in which the procedure for data transmission described in the following is implemented as a program or sequential control. The data transmission from the sensors to the central control unit, which is unidirectional in the preferred exemplary embodiment, is performed via two-wire lines 24 to 34, which are connected to central control unit 10 and the decentralized sensors in the framework of a point-to-point connection. In other exemplary embodiments, a bus connection is used.

A preferred application of the system shown in FIG. 1 is in connection with restraining systems for automobiles, it being possible to vary the number of sensors from that shown in FIG. 1. In this case, the sensors are pressure sensors which detect a pressure exerted on them. It is not possible for one single pressure sensor to analyze whether the pressure information obtained is correct on the basis of this measured absolute pressure. In a system designed as in FIG. 1, the central control unit has multiple sets of pressure information available from multiple pressure sensors, which do not communicate with one another, but do transmit all of their pressure values to the central control unit. Therefore, the control unit is capable, on the basis of the absolute pressure values of the individual sensors, of comparing these with one another for plausibility and deriving error functions. Since the pressure gradient within the system, in particular within a motor vehicle, is negligibly small, the absolute pressure values of the individual sensors must lie in a defined tolerance band relative to one another in the event of correct function. Therefore, for restraining systems, the absolute pressure values may be compared on this basis and checked for plausibility in the central control unit.

Figure 3:
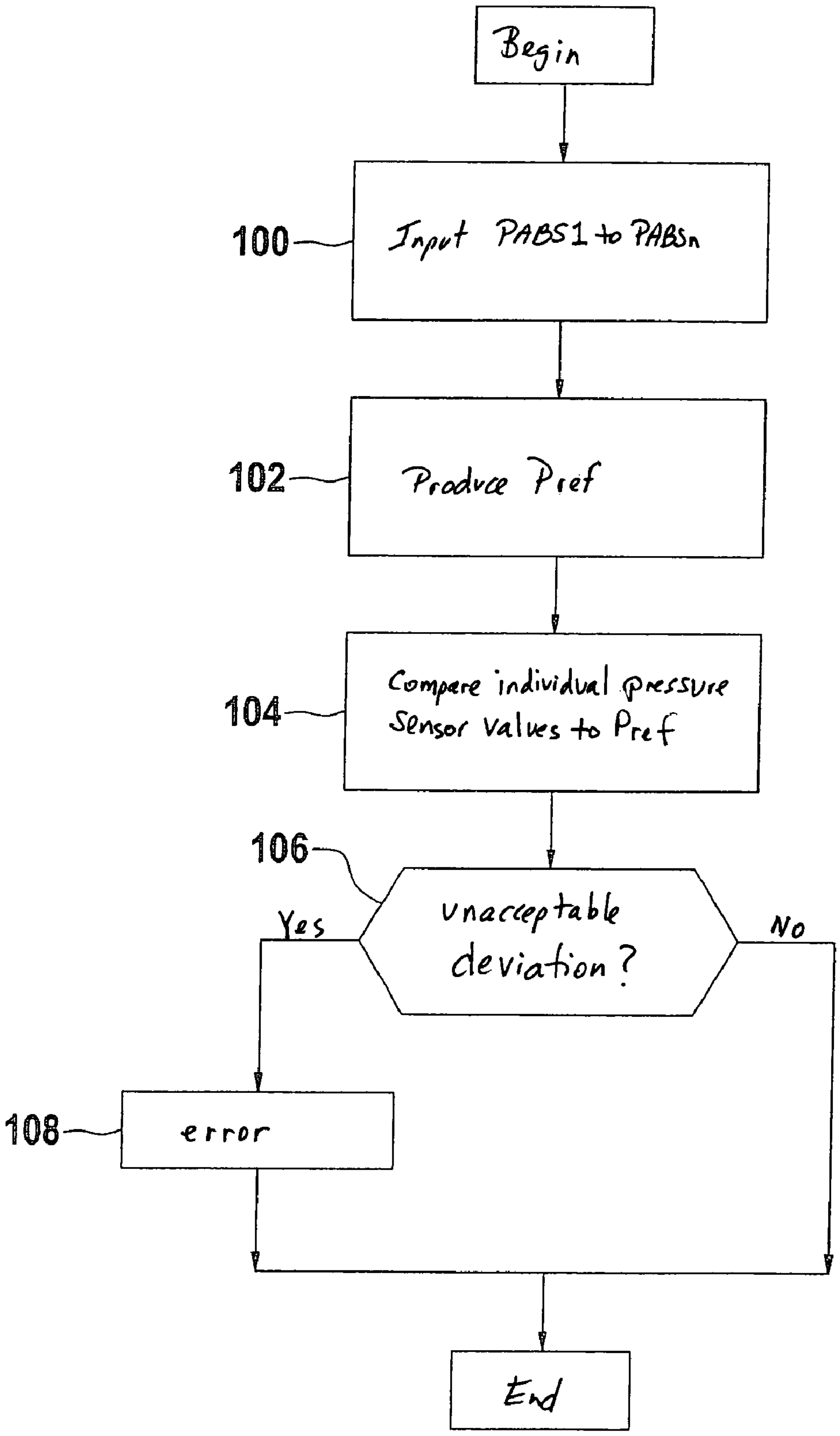
FIG. 3 shows a second flow chart, the procedure for data transmission in connection with pressure sensors, preferably in restraining systems, is outlined on the basis of flow charts.

A possible procedure for implementing this plausibility check is shown on the basis of the flow chart in FIG. 3. This flow chart outlines the program of a microcomputer contained in central control unit 10. The program is run through at a specified cycle rate. First, in step 100, absolute measured values PABS1 to PABSn (n is the number of sensors) provided by the sensors are input. A pressure reference value Pref is then produced in step 102. Depending on the embodiment, this value is either one of the sensor pressure values or an average value of sensor pressure values, etc. In subsequent step 104, the individual pressure sensor values are compared to the reference value. Subsequently, it is checked in step 106 whether there is an unacceptable deviation between a sensor value and the reference value. If so, an error is established in the relevant pressure sensor in step 108, while if there is no unacceptable deviation, i.e., if all sensor signals lie within a predetermined tolerance band, fault-free operation is assumed.

Other procedures, e.g., comparisons of the pressure values to one another, are also used in other embodiments for the plausibility check.

It has been shown to be suitable for many applications not to transmit absolute pressure values for performing the control tasks, but rather to transmit differential pressure values, for example the differential value between a reference pressure and the instantaneous measured pressure. In this way, environmental parameters are already taken into consideration in the sensor, so that the measured pressure values transmitted do not have to be additionally analyzed in the central control unit. In these cases, it must also be ensured in the scope of the function check of the sensors described above that the absolute pressure values are transmitted in addition to or instead of the differential pressure.

In a first exemplary embodiment, it has been shown to be suitable to perform the absolute pressure transmission in the initialization phase, and to change over to a differential pressure transmission after the initialization phase has ended. In this case, the sensors are therefore checked in the initialization phase on the basis of the absolute pressure values transmitted.

Figure 2:
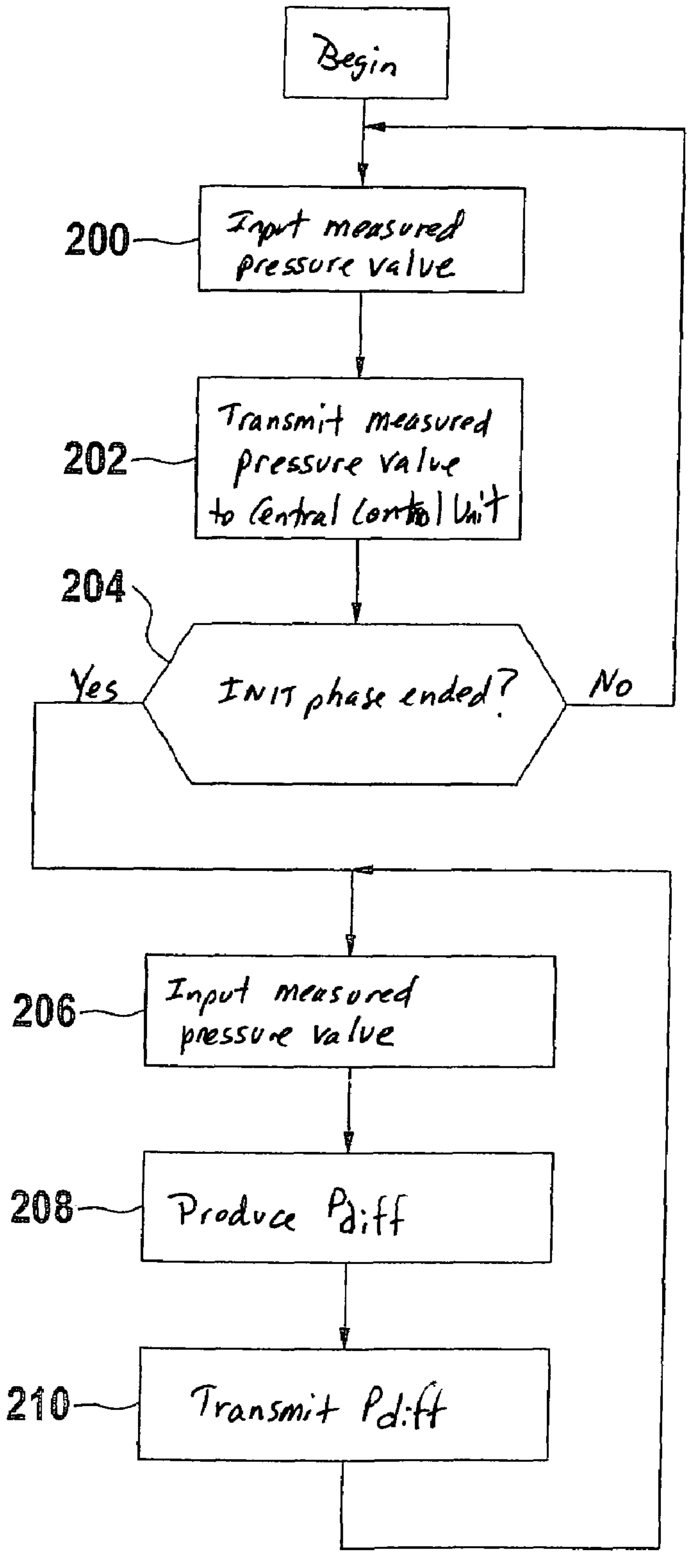
FIG. 2 shows a first flow chart, the procedure for data transmission in connection with pressure sensors, preferably in restraining systems, is outlined on the basis of flow charts.

This embodiment is outlined on the basis of the flow chart in FIG. 2. This flow chart describes the sequence in the interface component of a pressure sensor. The measured pressure value is input when the system is switched on (INIT phase) in first step 200. This value is then transmitted to the central control unit in step 202. It is then checked in step 204 whether the initialization phase has ended. If not, steps 200 and 202 are repeated. Otherwise, the measured pressure value is input in step 206 and differential pressure value Pdiff is produced in step 208. This is performed, for example, by producing the difference of the measured pressure value and a reference pressure value, or an average of earlier measured pressure values. The differential pressure value is then transmitted in step 210. Steps 206 to 210 are repeated until the operating cycle is ended, by turning off the supply voltage, for example. In this way, continuous transmission of the differential pressure value is ensured.

Depending on the exemplary embodiment, a point-to-point interface to each sensor or a bus system which connects all components is provided as the interface between the sensors and the central control unit. For a point-to-point interface, it has been shown to be suitable in a preferred exemplary embodiment to provide a current-based two-wire interface as outlined in the related art initially cited.

The first exemplary embodiment outlined above describes the transmission of absolute pressure values in the initialization phase. Checking the sensor function during running operation is not possible with such an implementation. Therefore, permitting checking of the absolute pressure value even during running operation, and therefore allowing error detection in the sensor system in the way described above even during running operation of the system, is provided as a supplement or alternative in the framework of a second exemplary embodiment.

If differential pressure values and/or normalized differential pressure values are transmitted as described above, in order to be independent of the ambient pressure and therefore independent of the current elevation or pressure variations due to weather, measures are to be taken which also allow absolute pressure values to be transmitted in addition to these differential pressure values. In this case, normalized pressure values are understood as pressure values which are normalized in such a way that a signal not equal to 0 is transmitted only in the event of dynamic pressure variations. This means that in the event of stationary pressure values, the signal value is 0. In this case as well, errors in the sensor that are distinguished by an output signal which is constant over time may not be recognized.

Therefore, mixing in absolute pressure values in addition to transmitting the normalized differential pressure values is provided during transmission from the sensor to the central control unit during normal operation of the system. The transmitted absolute pressure values are then compared to one another by the central control unit as described above and indices for correct and/or faulty function of the individual sensors are derived therefrom.

The absolute pressure values are transmitted in this case only as long as there is no significant signal change in the differential pressure. As soon as such a change in differential pressure is recognized, the sensor immediately stops the possibly ongoing absolute pressure transmission and switches over to differential pressure transmission. This measure ensures that no system performance is lost by the additional transmission of absolute pressure values.

Furthermore, data mixing or confusion is not possible, since the different types of data (absolute pressure, differential pressure) are uniquely assignable via their value range.

In the preferred exemplary embodiment, the interface between the sensor and the central control unit is a current-based two-wire interface, as is known from the related art initially cited. In this case, the differentiation between absolute pressure data and differential pressure data is performed through a corresponding identification of the data using different identification codes. In addition, the absolute pressure value is coded in a data word whose value range lies outside the value range of the useful data (differential pressure).

In other embodiments, one of the measures described is sufficient.

The absolute pressure values therefore include a combination of identification code and data word, both the identification code and the data word being located outside the data range of the differential pressure values. In this way, it is ensured that the absolute pressure values may not be confused with regular differential pressure values.

In the preferred exemplary embodiment, the value range for data transmission in this case is divided essentially into three parts as described in the related art initially cited, a middle range, which includes the useful data, the differential pressure data in the present case, and the regions outside the useful data range, which include status reports, identification data, etc. To transmit the absolute pressure values and to prevent collisions, the absolute pressure values are prefixed by their own identifier and the absolute pressure values are transmitted as a data word which has a value range lying outside the useful data signal, i.e., in the status report range, for example. Because of the small word length in these ranges, the absolute pressure data word is divided and is transmitted in multiple portions, provided with an appropriate identifier.

Absolute pressure value is understood as the instantaneous measured pressure value, while an average value of preceding measured pressure values, which are set in relation to the instantaneous measured pressure value, is used to produce the differential pressure value.

Figure 4:
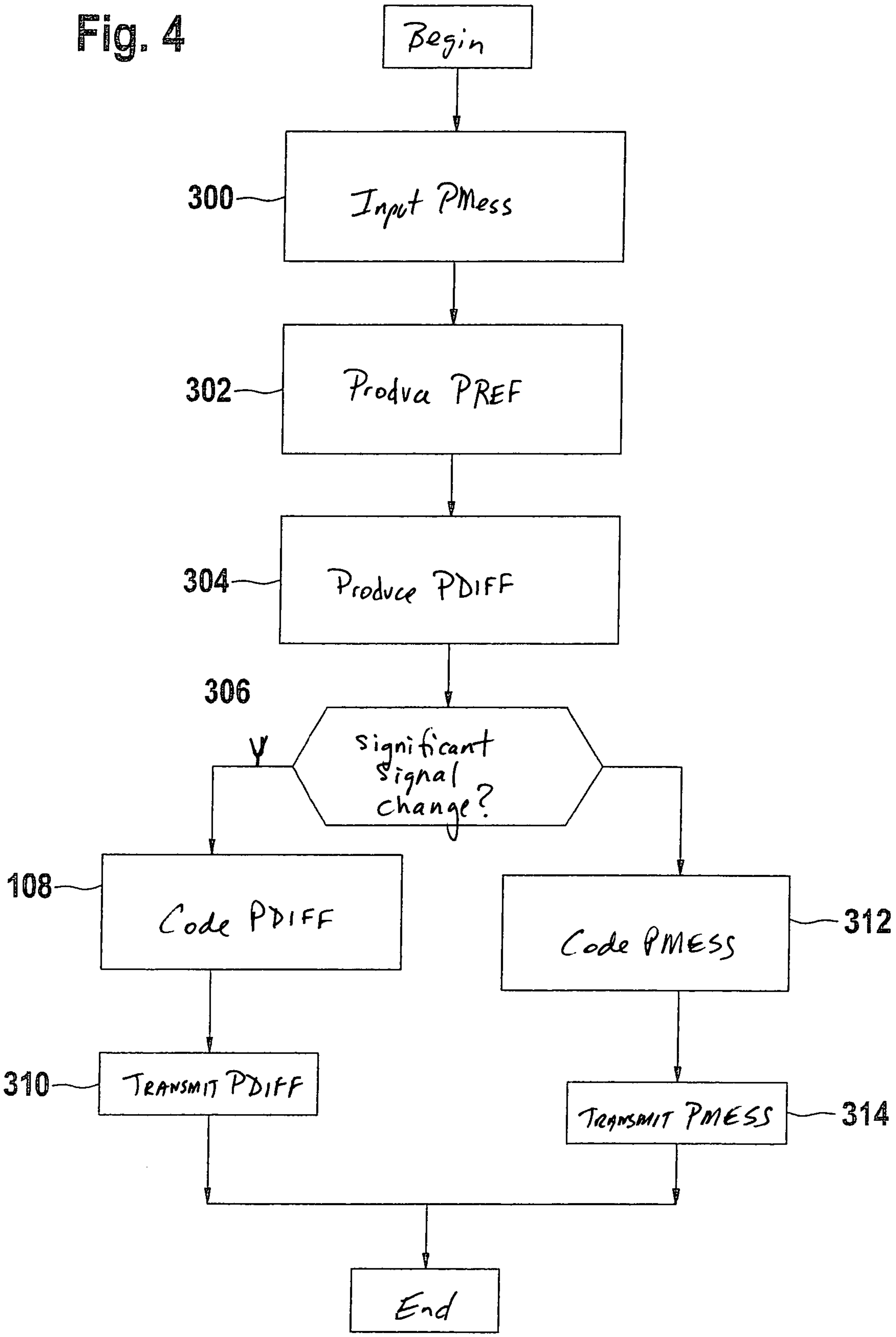
FIG. 4 shows a third flow chart, the procedure for data transmission in connection with pressure sensors, preferably in restraining systems, is outlined on the basis of flow charts.

FIG. 4 shows a flow chart in which the sequence in the sensor for transmitting differential pressure values and absolute pressure values during running operation is outlined. The sequence shown in FIG. 4 is performed in predetermined time intervals. First, instantaneous measured pressure value PMess is input in first step 300. Subsequently, in step 302, reference pressure value PREF is produced on the basis of preceding values and differential pressure value PDIFF is produced in step 304 on the basis of the instantaneous measured pressure value and the reference pressure value. This value may be supplied with an additional normalization in one exemplary embodiment, which normalizes the differential pressure value to an average value from preceding differential pressure values, for example. Subsequently, in step 306, it is determined on the basis of the instantaneous differential pressure value and one or more preceding differential pressure values whether there is a significant signal change. If so, a possibly ongoing transmission of absolute pressure values is stopped, the instantaneous differential pressure value in the first value range, which is available for data transmission, is coded as a data word, the corresponding identifier is selected, and the identifier and data word are transmitted in step 310.

If no significant signal change was recognized in step 304, then in step 312 absolute measured value PMESS is coded as a data word in a second value range which is available for data transmission. If the word width is restricted in the particular application, the data word is separated into multiple sections, the corresponding identifier is selected, and the data transmission is performed in multiple sections which include identifier and data word in step 314. The procedure described is then repeated in the next time interval.

The procedure described is used in connection with restraining systems in particular, but may also be used in other systems having distributed pressure sensors.

Furthermore, the application of the procedure described using the example of pressure sensors is not restricted to pressure sensors, but rather may be used anywhere where decentralized sensors of the same type transmit differential values as useful data to a shared central control unit without the possibility of checking themselves.

The invention claimed is:

1. A method for transmitting data from a plurality of pressure sensors of a same type to a control unit, comprising:

causing each of the pressure sensors to measure a variable;

causing each of the pressure sensors to transmit the variable measured by each of the pressure sensors to the control unit as differential values; and transmitting additional absolute measured values of the variable in at least one operating state, wherein:

the at least one operating state includes an initialization phase of a system that includes the pressure sensors and the control unit;

a function of a restraining system for the control unit is performed on the basis of the differential values;

a function check of the pressure sensors is performed on the basis of the absolute values; and the transmission of the additional absolute measured values is stopped depending on a signal change of the differential values.

2. The method as recited in claim 1, wherein:

the variable includes a pressure value.

3. The method as recited in claim 1, further comprising:

providing a value range for data transmission;

dividing the value range into multiple value ranges;

coding the differential values in a first value range; and coding the absolute measured values in a second value range.

4. The method as recited in claim 1, further comprising:

providing identifiers for data transmission, the identifiers being prefixed to a particular data word and differing with respect to differential data and absolute data.

5. The method as recited in claim 1, wherein:

at least one of the variable and the absolute measured values are transmitted via a current-based two-wire interface.

6. The method as recited in claim 1, wherein:

the absolute measured values and the differential values are transmitted during a running operation.

7. A pressure sensor operable as part of a system that includes a control unit, the pressure sensor, and a plurality of additional pressure sensors of the same type, the pressure sensor comprising:

an interface for transmitting data to a central control unit;

an arrangement for detecting measured values; and a component that relates the detected measured values to a reference value to produce differential measured values, the component transmitting one of:

the differential measured values, and in at least one predetermined operating state, absolute measured values, wherein:

the at least one predetermined operating state includes an initialization phase of the system;

a function of a restraining system for the control unit is performed on the basis of the differential values;

a function check of the pressure sensor and the additional pressure sensors of the same type is performed on the basis of the absolute values; and a transmission of the absolute measured values is stopped depending on a signal change of the differential values.

8. The sensor as recited in claim 7, wherein:

the pressure sensor is configured to operate in a restraining system for an automobile.

9. A control unit for a restraining system that includes distributed, decentralized pressure sensors of the same type, comprising:

an interface; and an arrangement for receiving differential values and absolute measured values from the pressure sensors via the interface, the absolute measured values being received in at least one operating state which includes an ini tialization phase of a system that includes the pressure sensors and the control unit, wherein:

a function of the restraining system is performed on the basis of the differential values, a function check of the pressure sensors is performed on the basis of the absolute values; and a transmission of the absolute measured values is stopped depending on a signal change of the differential values.

* * * * *